United States Patent [19]

Saegusa

[11] Patent Number: 5,840,267
[45] Date of Patent: Nov. 24, 1998

[54] METHOD FOR PRODUCING METAL OXIDE POWDERS

[75] Inventor: Kunio Saegusa, Ibaraki, Japan

[73] Assignee: Sumitomo Chemical Co., Ltd., Osaka, Japan

[21] Appl. No.: 670,536

[22] Filed: Jun. 27, 1996

[30] Foreign Application Priority Data

Jul. 6, 1995 [JP] Japan ................................. 7-196193

[51] Int. Cl.⁶ .............................. C01B 13/32; C01B 7/01; C01B 7/09; C01B 7/13

[52] U.S. Cl. ............................. 423/592; 501/1; 501/94; 423/593; 423/594; 423/595; 423/596; 423/598; 423/599; 423/600; 423/604; 423/605; 423/606; 423/607; 423/608; 423/610; 423/617; 423/618; 423/619; 423/620; 423/622; 423/624; 423/625; 423/632; 423/635; 423/636; 423/263

[58] Field of Search ..................... 501/1, 94; 423/592, 423/593, 594, 595, 596, 598, 599, 600, 604, 605, 606, 607, 610, 618, 619, 622, 624, 625, 632, 635, 636, 263, 608, 617, 620

[56] References Cited

U.S. PATENT DOCUMENTS 5,447,708   9/1995   Helble et al. ........................... 423/593
5,635,153   6/1997   Stoltzfus et al. ....................... 423/592
5,650,130   7/1997   Katz et al. ............................. 423/592

OTHER PUBLICATIONS

CA 123:13046, Mohri et al. "Composite metal oxide powders and their manufacture", corresponds to WO95 04701 A1, Feb. 1995.

CA 123:13045, Mohri et al., "Metal oxide powders with reduced aggregated particles and narrow particle size distribution and their manufacture", corresponds to WO95 04700 A1, Feb. 1995.

Primary Examiner—Michael Marcheschi
Attorney, Agent, or Firm—Sughrue, Mion, Zinn, Macpeak & Seas, PLLC

[57] ABSTRACT

A method for producing a metal oxide powder which comprises heating a metal or metals in an atmosphere gas comprising a halogen gas, a hydrogen halide gas or a mixture of these gases in a concentration of from 0.5% by volume or more to 99.5% by volume or less; and oxygen, water vapor or a mixture of these gases in a concentration of from 0.5% by volume or more to 99.5% by volume or less.

6 Claims, 4 Drawing Sheets

METHOD FOR PRODUCING METAL OXIDE POWDERS

BACKGROUND OF THE INVENTION

1. Field of the Invention

The present invention relates to a method for producing a metal oxide powder. More precisely, the present invention relates to a method for producing a metal oxide powder used as a raw material for an oxide ceramic as a functional material or structural material, a metal oxide powder used in a dispersed state such as a filler, pigment and the like or a metal oxide powder used as a raw material for producing a single crystal, a powdery material for flame spray and the like.

2. Background Information

The oxide ceramic as the functional material or structural material is usually produced through a forming step and a sintering step, using a metal oxide powder as a raw material. Properties of the metal oxide powder used as a raw material have great influence on a producing process and functions or properties of ceramics as a final product. Accordingly, there is a strong demand for a metal oxide powder having particle properties in which particle size and particle size distribution are precisely controlled according to the intended final use.

Further, when the metal oxide powder is utilized in a dispersed state as in a magnetic powder, filler, pigment or the like, properties of each particle are directly reflected on those of the product. Therefore, control of particle properties such as particle size and particle size distribution have an increased importance.

While properties required for the metal oxide powder vary from one powder to another, depending on the kind and final use of the metal oxide, commonly required properties include a uniform particle size of the metal oxide particles, which means narrow particle size distribution, and weak bonding force among primary particles, which means less agglomeration and good dispersibility.

Vapor phase methods such as the vapor condensation method and the vapor phase reaction method have hitherto been known as the methods for producing metal oxide powders. For example, the vapor phase reaction method is a method in which a metal oxide powder is produced by a chemical reaction of a metal vapor or a metal compound in vapor phase. These methods, however, had problems that steps of producing particles were complicated and particle size and particle size distribution were difficult to be controlled and that apparatus factors had a great influence, and so on. Furthermore, substances such as chloride, metal and the like used as the raw material and the apparatus were expensive. Therefore, these method were not industrially useful method of producing the metal oxide powders.

Also, a method was known as the conventional method for producing metal oxide powder in which a metal oxide precursor powder obtained by a liquid phase method was heated. In the liquid phase method, for example, precipitation method, co-precipitation method, hydrolysis method and the like, a metal oxide precursor powder such as hydrate was produced from a solution of a metal salt in water or organic solvent as a starting material. Then, the precursor powder was heated to produce the metal oxide powder.

In the above described liquid phase method, the metal oxide powder was produced by heating the material in an atmosphere containing oxygen or an inert gas atmosphere such as nitrogen or the like. The metal oxide powder produced by said method had a strong bonding force among primary particles and was strongly agglomerative. Therefore, a grinding step after the heat treatment was essential. In this grinding step, however, complete cleavage of the bonding among primary particles was difficult and a problem remained that the distribution of particle size was broad. Another problem was unavoidable contamination of the product caused by grinding media.

It has never been reported that a metal oxide powder was produced by heating a metal powder in an atmosphere other than an atmosphere containing oxygen, nitrogen and an inert atmosphere.

On the other hand, regarding a metal oxide which is a compound comprising a single metal element and oxygen, a result obtained by sintering a formed metal oxide in an atmosphere containing hydrogen chloride was reported in J. Am. Ceram. Soc., 69, 580 (1986) and ibid., 70, C-358 (1987).

The former described a behavior of zirconium oxide on sintering in an atmosphere of hydrogen chloride and the latter did a behavior of titanium oxide on sintering. In the latter, a formed metal oxide was sintered at 1000° C.–1300° C. in an atmosphere of hydrogen chloride to form a porous substance by growth of particles caused by an extremely rapid growth of necks between grains inhibiting shrinkage.

A further method has been described in JP-A-55-60004, in which a metal oxide was produced by reacting a halogenating agent with a mixture of solid metal oxides, separating halides and oxidizing the halides. The method, however, had the same problems as in the method for producing metal oxide powder by vapor phase method, that steps of producing particles were complicated and particle size and particle size distribution were difficult to be controlled and that apparatus factors had a great influence, and so on. Furthermore, the raw material and the apparatus were expensive. Therefore, said method was not an industrially useful method of producing the metal oxide powders.

As a result of extensive study, it has been found that the metal oxide powder of high crystallinity, with less agglomerated particles and narrow particle size distribution, can be produced by heating a raw material in an atmosphere gas comprising a halogen gas, a hydrogen halide gas or a mixture of these gases, and oxygen, water vapor or a mixture of these gases in a specific concentration, and thus have completed the present invention.

SUMMARY OF THE INVENTION

The present invention provides a method for producing a metal oxide powder which comprises heating a metal or metals in an atmosphere gas comprising a halogen gas, a hydrogen halide gas or a mixture of these gases in a concentration of from 0.5% by volume or more to 99.5% by volume or less; and oxygen, water vapor or a mixture of these gases in a concentration of from 0.5% by volume or more to 99.5% by volume or less.

DETAILED DESCRIPTION OF THE INVENTION

The present invention will be described below in more detail.

The metal oxide produced in the present invention includes to a compound comprising one, two or more kinds of metal elements and oxygen, simple metal oxides which are compounds comprising one kind of metal element and oxygen, complex metal oxides which are compounds comprising two or more kinds of metal elements and oxygen.

The metal as the raw material used in the present invention may be in any form such as a fine powder, shot, ribbon (turning), wire, foil, rod, plate, slab and the like, and means one which forms a metal oxide comprising one, two or more kinds of metal elements and oxygen when subjected to oxidation reaction or the like by heating.

When the product is a simple metal oxide, the metal elements include, for example, metal elements belonging to the group 2 such as Be, Mg, Ca, Sr, Ba and the like; metal elements belonging to the group 12 such as Zn, Cd and the like; metal elements belonging to the group 3 such as Sc, Y, La, Ce, Nd, Pr, Eu, Tb, Gd and the like; metal elements belonging to the group 13 such as B, Al, Ga, In, Tl and the like; metal elements belonging to the group 4 such as Ti, Zr, Hf and the like; metal elements belonging to the group 14 such as Si, Ge, Sn, Pb and the like; metal elements belonging to the group 5 such as V, Nb, Ta and the like; metal elements belonging to the group 15 such as Sb, Bi and the like; metal elements belonging to the group 6 such as Cr, Mo, W and the like; metal elements belonging to the group 16 such as Se, Te and the like; metal elements belonging to the group 8–10 such as Fe, Ru, Os, Co, Rh, Ir, Ni, Pd and the like; and Cu, Mn and the like.

In the metal element as the raw material used in the present invention, a free energy in reactions represented by the following equation preferably of +50 KJ/mol or less, more preferably of +20 KJ/mol or less and most preferably of +10 KJ/mol or less in the temperature of 500° to 1500° C.

When the atmosphere gas is fluorine, hydrogen fluoride, chlorine or hydrogen chloride, the reaction proceeds as follows:

$$MX_n + n/2 H_2O \rightarrow MO_{n/2} + nHX$$

When the atmosphere gas is bromine, hydrogen bromide, iodine or hydrogen iodide, the reaction proceeds as follows:

$$MX_n + n/4 O_2 \rightarrow MO_{n/2} + n/2 X_2$$

wherein M is a metal element used as the starting material, X is a kind of halogen atom in halogen gas or hydrogen halide gas used as the atmosphere gas and represents a halogen atom selected from the group consisting of fluorine, chlorine, bromine and iodine atoms; and n is a valence of said metal element.

Specifically, when the atmosphere gas is chlorine gas and/or hydrogen chloride gas, the difference in free energy representing the difference in stability of a metal oxide and a metal chloride, at 1000° C., is 72.6 KJ/mol for Li and therefore lithium oxide can not be produced by this method. As the difference in free energy is −134 KJ/mol for Be, said method is available.

Similarly calculated are: Mg, (−41 KJ/mol); B, (−369 KJ/mol); Al, (−332 KJ/mol); Ga, (−36.7 KJ/mol); In, (−12.2 KJ/mol); Si, (−254 KJ/mol); Ge, (−57 KJ/mol); Sn, (−67.2 KJ/mol); Y, (−194.6 KJ/mol); Ce, (−188.16 KJ/mol); Ti, (−159.42 KJ/mol); Cr, (−346.5 KJ/mol); Fe, (−129 KJ/mol); Ni, (−38 KJ/mol); Zn, (24.8 KJ/mol) and so on.

These are examples of metals which metal oxide powders can be produced, and include generally metal elements selected from the group consisting of the group 3 elements such as Sc, Y, Ce, Pr, Nd, Pm, Eu, Gd, Tb, Dy, Ho, Er, Tm, Yb and Lu, the group 13 elements, the group 4 elements, the group 5 elements, the group 6 elements, the group 8–10 elements in the Periodic Table of the Elements, Cu, Be, Mg, Si, Ge, Sn, Sb and Mn.

When the atmosphere gas is bromine gas and/or hydrogen bromide gas, the difference in free energy representing the difference in stability of a metal oxide and a bromide is more favorable to oxide than chloride. Therefore, all the metal oxide powders produced in the above described hydrogen chloride gas atmosphere can be produced and many other metal oxides can also be produced. For example, the difference in free energy, at 1000° C., is 31.2 KJ/mol for Li and therefore lithium oxide can not be produced by this method. As the difference in free energy is −203 KJ/mol for Be, said method is available.

Similarly calculated are: Mg, (−90 KJ/mol); B, (−577 KJ/mol); Al, (−461 KJ/mol); Ga, (−205 KJ/mol); In, (−24 KJ/mol); Si, (−369 KJ/mol); Ge, (−139 KJ/mol); Sn, (−97 KJ/mol); La, (−154 KJ/mol); Bi, (41 KJ/mol); Ti, (−258 KJ/mol); Fe, (−187 KJ/mol); Ni, (−50 KJ/mol); Zn, (8 KJ/mol) and so on.

These are examples of metals which metal oxide powders can be produced, and include generally metal elements selected from the group consisting of the group 12 elements, the group 3 elements, the group 13 elements, the group 4 elements, the group 5 elements, the group 6 elements, the group 8–10 elements in the Periodic Table of the Elements, Cu, Be, Mg, Ca, Si, Ge, Sn, Sb, Bi and Mn.

When the atmosphere gas is iodine gas and/or hydrogen iodide gas, the difference in free energy representing the difference in stability of a metal oxide and a iodide is more favorable to oxide than bromide. Therefore, all the metal oxide powders produced in the above described hydrogen bromide gas atmosphere can be produced and many other metal oxides can also be produced. For example, the difference in free energy, at 1000° C., is 7 KJ/mol for Li and therefore lithium oxide can be produced by this method.

Similarly calculated are: Ca, (−91 KJ/mol); Sr, (−9 KJ/mol); Ba, (42 KJ/mol); Pb, (−0.6 KJ/mol); Zn, (−84 KJ/mol); Cd, (−4 KJ/mol) and so on. These are examples of metals which metal oxide powders can be produced, and include generally metal elements selected from the group consisting of the group 2 elements, the group 12 elements, group 3 elements, the group 13 elements, the group 4 elements, the group 5 elements, the group 6 elements, the group 8–10 elements in the Periodic Table of the Elements, Li, Cu, Si, Ge, Sn, Pb, As, Sb, Bi and Mn.

When the atmosphere gas is fluorine gas and/or hydrogen fluoride gas, examples generally include metal elements selected from the group consisting of the group 3 elements, the group 13 elements, the group 4 elements, the group 5 elements, the group 6 elements, the group 8–10 elements in the Periodic Table of the Elements, Cu. Si and Ge.

In principle, the above criterion is also applied to the case in which the product is a solid solution of metal oxide which has two or more metal elements and oxygen. A free energy of each of two or more metal elements shown in the above equation is preferably 50 KJ/mol or less in a temperature of 500°–1500° C.

Further, when the product is a complex metal oxide which is a compound comprising two or more metal elements and oxygen, stability of energy by the formation of the complex oxide is expected, and therefore, in addition to said solid solution, in case where two kinds of metals M and M' form a complex oxide MM'O(n+m)/2, for example, the free energy of the reaction represented by the following equation is preferably 50 KJ/mol or less in a temperature of 500°–1500° C.

$$M'X_n + M''X_n + (n+m)/2H_2O \rightarrow M'M''O_{(n+m)/2} + (n+m)HX$$

wherein M' and M'' are metal elements, X is a species selected from fluorine, chlorine, bromine and iodine atoms; and n and m are valences of said metal elements.

In the method for producing a metal oxide powder according to the present invention, the metal as the raw material may be one produced by the conventional process and is not particularly limited. For example, the metal to be used may be produced by electrolytic reduction, carbothermic reduction, hydrogen reduction or the like and may be formed by extruding, drawing, casting, rolling or the like.

In the present invention, powders of the desired metal oxide may be dispersed in the metal or mixed with metal powder as the seed crystal in order to control the particle size. It is preferred that the particle size of the seed crystal is ½ or less of the particle size of metal oxide powder as the final product.

According to the present invention, the metal as the raw material is heated in an atmosphere gas containing 0.5% by volume or more and 99.5% by volume or less, preferably 5% by volume or more and 95% by volume or less, more preferably 10% by volume or more and 90% by volume or less and most preferably 10% by volume or more and 50% by volume or less of a hydrogen halide gas; 0.5% by volume or more and 99.5% by volume or less, preferably 0.5% by volume or more and 95% by volume or less and more preferably 0.5% by volume or more and 90% by volume or less of oxygen, water vapor or a mixture of these gases, based on the total volume of the atmosphere gas. As the hydrogen halide gas, any one of hydrogen chloride, hydrogen bromide, hydrogen iodide and hydrogen fluoride or a mixed gas of two or more of them can be used.

A halogen gas may be used in place of the hydrogen halide gas. Since the halogen gas forms an equilibrium system with a hydrogen halide gas, oxygen and water vapor, when concentrations for three gases among the above four gases are fixed, the concentration of the rest gas is decided by thermodynamic equilibrium conditions. Accordingly, the concentrations of the hydrogen halide gas and halogen gas are not decided by the concentrations at the introduction of these gases but are decided by the concentration of oxygen gas, the concentration of water vapor gas and the temperature, and are not decided independently. A mixture of a hydrogen halide gas and a halogen gas can also be used.

According to the present invention, the metal as the raw material is heated in an atmosphere gas containing 0.5% by volume or more and 99.5% by volume or less, preferably 5% by volume or more and 95% by volume or less, more preferably 10% by volume or more and 90% by volume or less and most preferably 10% by volume or more and 50% by volume or less of a halogen gas; 0.5% by volume or more and 99.5% by volume or less, preferably 0.5% by volume or more and 95% by volume or less and more preferably 0.5% by volume or more and 90% by volume or less of oxygen, water vapor or a mixture of these gases, based on the total volume of the atmosphere gas. As the halogen gas, any one of fluorine, chlorine, bromine and iodine or a mixed gas of two or more of them can be used.

If necessary, as a dilution gas for the hydrogen halide gas or the halogen gas in the atmosphere gas, an inert gas such as nitrogen, argon and the like or hydrogen gas, carbon dioxide gas and the like can be used. The maximum amount of the inert gas is 99% by volume based on the total volume of the atmosphere gas. The pressure in the system is not particularly limited and may optionally be selected within a range which can be industrially used.

In the method of the present invention, it is necessary to exist oxygen and/or water vapor in the atmosphere gas together with a halogen gas and/or hydrogen halide gas during heating the metal as the raw material.

It should be noted that if the metal as the raw material is heated in an atmosphere containing only a halogen gas or a hydrogen halide gas and no oxygen or water vapor, a metal halide is only produced and a metal oxide is not produced.

Also, if the metal as the raw material is heated in an atmosphere containing only oxygen or water vapor and no halogen gas or hydrogen halide gas, a metal oxide is produced but a highly crystalline particle having a visible crystal surface is not obtained and is an agglomerate of amorphous fine particles.

The concentration of oxygen and/or water vapor must be the concentration which can provide a pressure allowing thermodynamically stable existence of the produced metal oxide at a reaction temperature and depends on substances. For example, when the metal is aluminum, the partial pressure of oxygen may be as low as $10^{-5}$ atmosphere.

In order to proceed the reaction at an industrially favorable rate, it is necessary to feed excess oxygen and/or water vapor with respect to molar amount of the metal as the raw material. As a method, a dilute oxygen and/or water vapor gas in greater flow rate may be used but, from the view point of efficiency, a concentration of about 0.5% by volume or more is generally preferred. The air can be used as an oxygen source.

If necessary, as a dilution gas, an inert gas such as nitrogen, argon and the like or hydrogen gas, carbon dioxide gas and the like can be used. The pressure in the system is not particularly limited and may optionally be selected within a range which can be industrially used.

In the method of the present invention, source and method for supplying the atmosphere gas are not particularly limited and may be any one which enables introduction of the atmosphere gas into the reaction system containing the metal as the raw material.

For example, generally cylinder gases may be used as the source for the atmosphere gas. Alternatively, the atmosphere gas containing hydrogen halide or halogen may be prepared by utilizing evaporation or decomposition of halogen compounds such as ammonium halide and the like or halogen-containing high molecular compounds such as vinyl chloride polymer and the like. Furthermore, the atmosphere gas may be prepared by heating a mixture of the metal as the raw material and a halogen compound or a halogen-containing high molecular compound in a heating furnace.

When a decomposition gas such as ammonium halide or the like is used, decomposition of a solid material in the heating furnace may cause trouble in operation. Therefore, it is preferred to supply the hydrogen halide gas or the halogen gas directly from a cylinder or the like into a heating furnace. The atmosphere gas may be supplied continuously or batchwise.

Suitable heating temperature depends on the kind of desired metal oxide, the concentration of hydrogen halide or halogen gas in the atmosphere gas and the heating time is not particularly limited. Preferred temperature is 500° C. or more and 1500° C. or less. More preferred temperature is 600° C. or more and 1400° C. or less. When the heating temperature is less than 500° C., the heating may require a longer time and when the heating temperature exceeds 1500° C., the produced metal oxide powder may contain many agglomerates.

Suitable heating time depends on the kind of desired metal oxide, the concentration of hydrogen halide or halogen gas in the atmosphere gas and the heating temperature and is not particularly limited. The time is preferably a minute or longer, more preferably 10 minutes or longer and selected within a range of time in which the desired metal oxide is obtained. The higher the heating temperature rises, the shorter the heating time becomes.

The heating apparatus is not limited and may be a conventional heating furnace. Preferably, the heating furnace is made of a material which is not corroded by the hydrogen halide gas or halogen gas and has a mechanism for adjusting the atmosphere.

Further, since acidic gas such as hydrogen halide gas, halogen gas or the like is used, the heating furnace is preferably airtight. From the industrial view point, the heating is preferably performed by continuous manner and by using a tunnel furnace, a rotary kiln, a pusher furnace or the like.

Since the reaction proceeds in an acidic atmosphere, a container for containing the metal as a raw material or the like used in a heating furnace is preferably a crucible, boat or the like made of alumina, quartz, acid-resistant brick, graphite or a noble metal such as platinum and the like.

According to the above described method, a metal oxide powder is obtained which is non-agglomerative and is highly crystalline, as shown in drawings. Further, single crystal particles of polyhedron having a uniform particle size can be obtained.

While the particles may be agglomerates or may contain agglomerates depending on the raw material used or conditions for production, the agglomeration is weak and the agglomerates can be easily converted into metal oxide powders without agglomeration by subjecting to a simple disintegration with, for example, a jet mill.

While the metal oxide powder may contain a by-product or unreacted metal remained in addition to the desired product depending on the raw material used or conditions for production, the amount of the remained metal is small and can be removed by separation such as simple washing or the like to give the desired metal oxide powder.

The number average particle size of the metal oxide powder produced according to the method of the present invention is not particularly limited and usually about 0.1 $\mu$m–1 mm and preferably 0.1–100 $\mu$m.

According to the method of the present invention, it is possible to obtain a metal oxide powder of highly crystalline particle, containing less agglomerates and having a narrow particle size distribution which could not be obtained by the conventional method. It is also possible to obtain a metal oxide powder having, in addition to the above properties, an average particle size controlled within a range of about 0.1–100 $\mu$m.

Since the metal oxide powder of the present invention containing less agglomerate and having a narrow particle size distribution, the metal oxide powder can be used in a dispersed state such as a filler, pigment and the like or a raw material for producing a single crystal, a powdery material for flame spray.

EXAMPLES

The present invention will now be illustrated by means of the following Examples, which should not be construed as a limitation upon the scope of the invention.

In the Examples, the measurement of various properties were conducted in the following way.

1. Number average particle size of metal oxide powder:

A scanning electron microscope photograph of a metal oxide powder was taken using an electron microscope (model T-300, manufactured by JEOL). From the photograph, 80 to 100 particles were selected and image analyzed to calculate the mean of equivalent circle diameters of the particles and their distribution. The equivalent circle diameters refers to a diameter of a circle having the same area as that of a particle.

2. Particle size distribution of metal oxide powder:

The particle size distribution was measured using a laser scattering (Master Sizer manufactured by Malvern Instrument, Inc.) or a laser diffraction type particle size distribution analyzer (SALD-1100, manufactured by Shimadzu Corporation). The metal oxide powder was assayed dispersing in an aqueous ammonium polyacrylate solution or 50% by weight of aqueous glycerol solution and the particle sizes at 10% accumulation, 50% accumulation and 90% accumulation from the side of the smallest particle size in a cumulative particle size distribution were taken as values D10, D50 and D90. The D50 value was used as the particle size of agglomerate and D90/D10 ratio was calculated as an indicator for the particle size distribution.

3. Crystal phase of metal oxide powder:

The crystal phase of the metal oxide powder was measured by an X-ray diffraction meter (RAD-C, manufactured by Rigaku Co., Ltd.).

4. BET specific surface area of metal oxide powder:

The BET specific surface area of the metal oxide powder was measured by FLOWSORB-II (manufactured by Micromelitics).

A cylinder hydrogen chloride gas (99.9% purity) manufactured by Tsurumi Soda Co., Ltd. and a decomposition gas from ammonium chloride (special reagent grade, manufactured by Wako Pure Chemical Inc.) were used as hydrogen chloride sources. When the decomposition gas from ammonium chloride was used, an atmosphere gas was prepared by introducing a sublimation gas obtained by heating ammonium chloride above its sublimation temperature into a furnace core tube. Ammonium chloride was completely decomposed at 1100° C. to provide an atmosphere gas consisting of 33% by volume of hydrogen chloride gas, 17% by volume of nitrogen gas and 50% by volume of hydrogen gas.

A cylinder chlorine gas (99.4% purity) manufactured by Fujimoto Sangyo was used as chlorine gas.

A decomposition gas from ammonium bromide (special reagent grade, manufactured by Wako Pure Chemical Inc.) was used as a hydrogen bromide source. An atmosphere gas was prepared by introducing a sublimation gas obtained by heating ammonium bromide above its sublimation temperature into a furnace core tube. Ammonium bromide was completely decomposed at 1100° C. to provide an atmosphere gas consisting of 33% by volume of hydrogen bromide gas, 17% by volume of nitrogen gas and 50% by volume of hydrogen gas.

A decomposition gas from ammonium iodide (special reagent grade, manufactured by Wako Pure Chemical Inc.) was used as a hydrogen iodide source. An atmosphere gas was prepared by introducing a sublimation gas obtained by heating ammonium iodide above its sublimation temperature into a furnace core tube. Ammonium iodide was completely decomposed at 1100° C. to provide an atmosphere gas consisting of 25% by volume of hydrogen iodide gas, 16% by volume of nitrogen gas, 52% by volume of hydrogen gas and further 7% by volume of iodine (I, $I_2$) formed by decomposition of hydrogen iodide.

A decomposition gas from ammonium fluoride (special reagent grade, manufactured by Wako Pure Chemical Inc.) was used as a hydrogen fluoride source. An atmosphere gas was prepared by introducing a sublimation gas obtained by heating ammonium fluoride above its sublimation temperature into a furnace core tube. Ammonium fluoride was completely decomposed at 1100° C. to provide an atmosphere gas consisting of 33% by volume of hydrogen fluoride gas, 17% by volume of nitrogen gas and 50% by volume of hydrogen gas.

The metal as the raw material was charged in a platinum vessel or, when a halogen gas was used, an alumina vessel.

The heating was performed usually in a cylindrical furnace (manufactured by Motoyama Co., Ltd.) having a quartz muffle or an alumina muffle. Under a flow of the air or nitrogen gas, the temperature was raised at a heating rate within a range of 300° C./hour–500° C./hour. When the temperature reached a temperature for introducing an atmosphere gas, the produced atmosphere gas was introduced.

The concentration of the atmosphere gas was adjusted by controlling the flow rate of the gas by means of a flow meter. In all cases, the total pressure of the atmosphere gas was 1 atmosphere. The partial pressure of water vapor was controlled by a change in saturation water vapor pressure at a temperature of water and the water vapor was introduced into a heating furnace with the aid of the air or nitrogen gas.

After the temperature reached the predetermined temperature, the material was maintained at that temperature for a predetermined period of time. They are referred to herein as maintaining temperature (heating temperature) and maintaining time (heating time), respectively. The desired metal oxide powder was obtained by cooling spontaneously after the predetermined maintaining time.

Example 1

Into a platinum vessel was charged 3 g of tin metal shots (purity: 99.9% by weight; medium particle size: 0.4 µm; manufactured by Nippon Kagaku Sangyo).

Then, the vessel was placed in a quartz tube and, under a flow of a mixed gas consisting of hydrogen chloride gas and the air in a volume ratio of 2:8 at a linear velocity of 10 mm/minute, the vessel was heated at a heating rate of 300° C./hour from the room temperature to 1000° C., kept at a temperature of 1000° C. for 30 minutes and then allowed to cool to give a tin oxide powder in a yield of 82% by weight.

Figure 1:
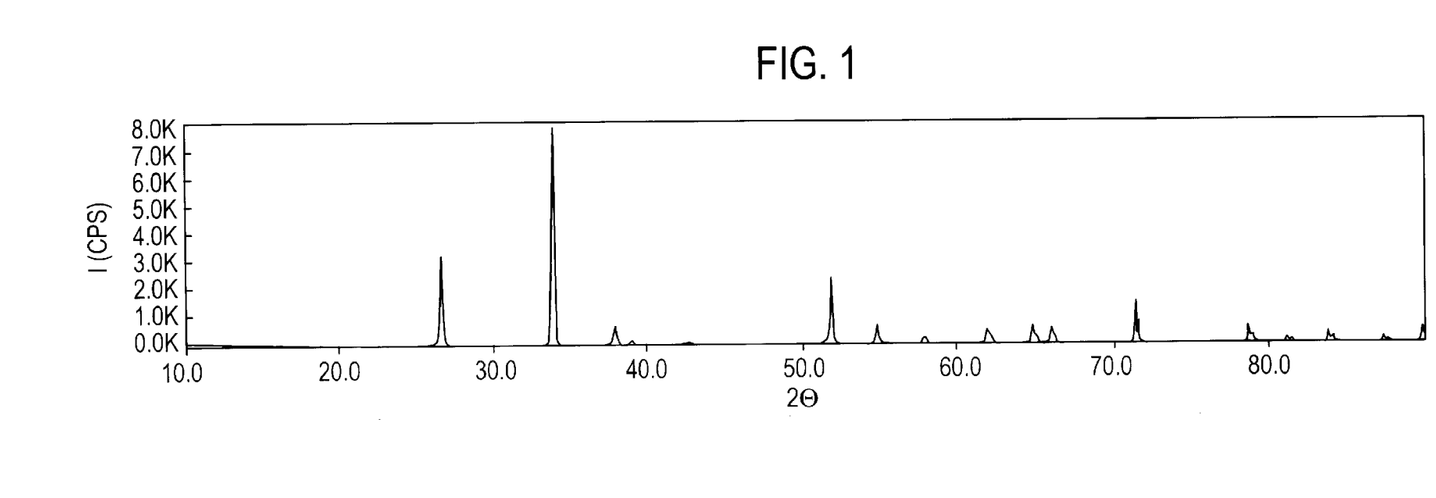
FIG. 1 is an X-ray diffraction pattern of tin oxide powder obtained in Example 1.
Figure 2:
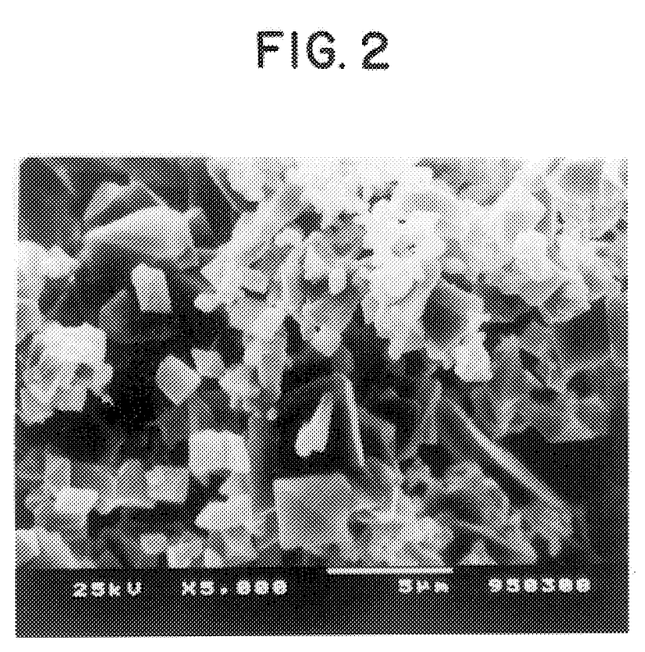
FIG. 2 is a scanning microscopic photograph of tin oxide powder obtained in Example 1.

The obtained tin oxide powder was analyzed by X-ray diffraction and found to be a tin oxide represented by rutile type $SnO_2$ with no other peak (FIG. 1). According to analysis by a scanning electron microscope, the powder had a number average particle size of 2 µm. The electron microscope photograph of the powder is shown in FIG. 2.

Example 2

To 100 g of isopropyl alcohol (special reagent grade, manufactured by Wako Pure Chemical Inc.) were added 3 g of a powdery aluminum (purity: 99.9% by weight; particle size: 1 µm; manufactured by Wako Pure Chemical Ind., Ltd.) and 0.1 g of α-aluminum oxide (AKP-50, manufactured by Sumitomo Chemical Co., Ltd.). They were mixed with stirring with ultrasonic dispersion for 10 minutes. Removal of isopropyl alcohol by an evaporator and a vacuum drier gave mixed powders of aluminum-aluminum oxide, which were charged in a platinum vessel.

Then, the vessel was placed in a quartz muffle and, under a flow of nitrogen gas at a linear velocity of 20 mm/minute, the vessel was heated at a heating rate of 300° C./hour from the room temperature to 400° C., when the gas was switched over to an atmosphere gas consisting of 30% by volume of hydrogen chloride gas and 70% by volume of the air, under a flow at a linear velocity of 10 mm/minute. The vessel was heated at 1000° C. for 60 minutes and then allowed to cool to give an alumina powder.

Figure 3:
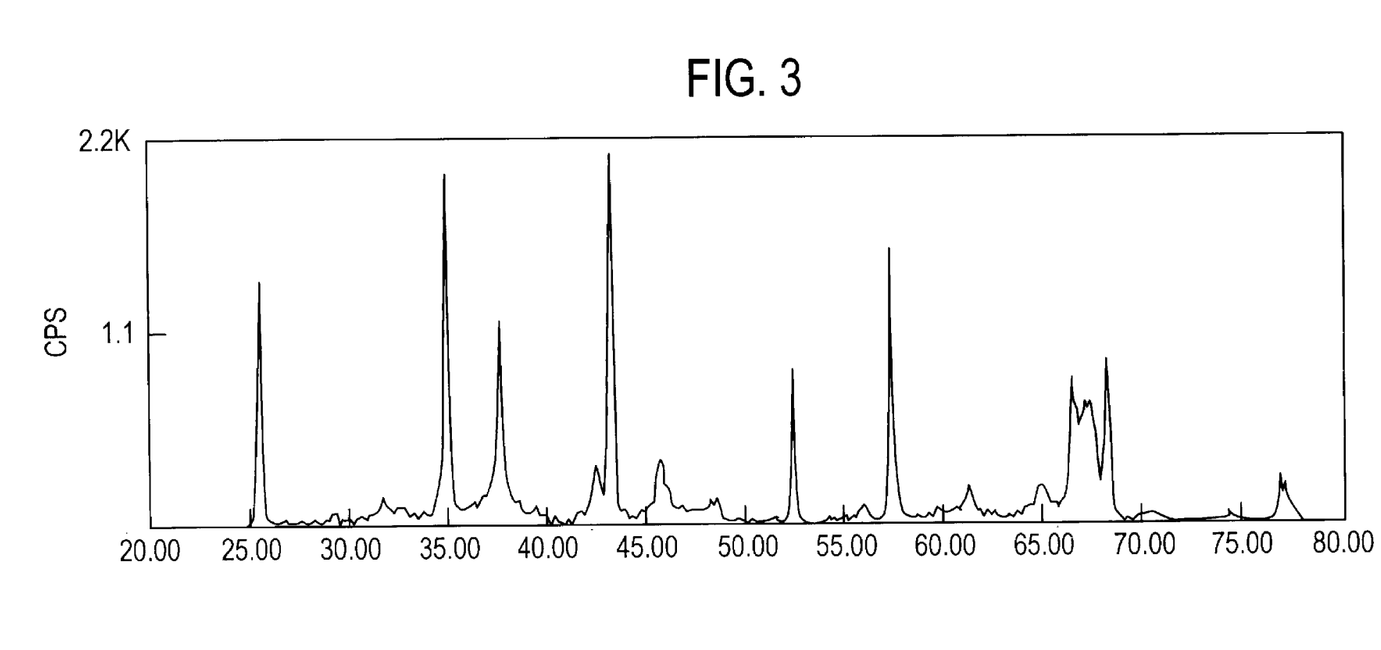
FIG. 3 is an X-ray diffraction pattern of alumina powder obtained in Example 2.
Figure 4:
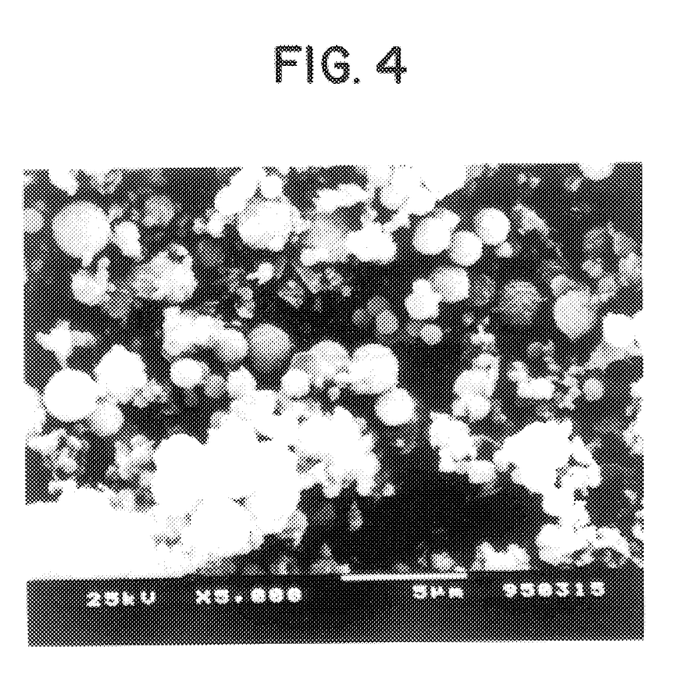
FIG. 4 is a scanning microscopic photograph of alumina powder obtained in Example 2.

The obtained alumina powder was analyzed by X-ray diffraction and found to be an α-alumina represented by $Al_2O_3$ with no other peak (FIG. 3). According to analysis by a scanning electron microscope, the powder comprising spherical particles having a particle size of 2–3 µm was formed. The electron microscope photograph of the obtained powder is shown in FIG. 4.

Example 3

Into a platinum vessel was charged 3 g of an indium metal granule (purity: 99.9% by weight, manufactured by Wako Pure Chemical Inc.).

Then, the vessel was placed in a quartz muffle and, under a flow of a mixed gas consisting of hydrogen bromide gas and the air in a volume ratio of 1:9 at a linear velocity of 10 mm/minute, the vessel was heated at a heating rate of 300° C./hour from the room temperature to 1000° C., kept at a temperature of 1000° C. for 60 minutes and then allowed to cool to give a indium oxide powder in a yield of 82% by weight.

The obtained indium oxide powder was analyzed by X-ray diffraction and found to be an indium oxide represented by $In_2O_3$ with no other peak. According to analysis by a scanning electron microscope, the powder had a number average particle size of 60 µm.

Example 4

Into a platinum vessel was charged 3 g of a zinc metal powder (purity: 99.9% by weight; medium particle size: 0.4 µm; manufactured by Wako Pure Chemical Inc.).

Then, the vessel was placed in a quartz muffle and, under a flow of a mixed gas consisting of hydrogen iodide gas and the air in a volume ratio of 2:8 at a linear velocity of 10 mm/minute, the vessel was heated at a heating rate of 300° C./hour from the room temperature to 900° C., kept at a temperature of 900° C. for 60 minutes and then allowed to cool to give a zinc oxide powder in a yield of 95% by weight.

The obtained zinc oxide powder was analyzed by X-ray diffraction and found to be a zinc oxide represented by ZnO with no other peak. According to analysis by a scanning electron microscope, the powder had a number average particle size of 5 µm.

The metal oxide powder obtained by the method according to the present invention is a bulk material comprising homogeneous polyhedral particles or spherical dispersing particles, and can suitably be used as a material for a metal oxide ceramic as a functional material or structural material, a metal oxide powder used in a dispersed state such as a filler, pigment and the like or a material for producing a single crystal or flame spray.

What is claimed is:

1. A method for producing a metal oxide powder which comprises heating a metal or metals in an atmosphere gas comprising (a) a halogen gas, a hydrogen halide gas or a mixture of these gases in a concentration of from 0.5% by volume or to 99.5% by volume; and (b) oxygen, water vapor or a mixture of these gases in a concentration of from 0.5% by volume to 99.5% by volume.

2. The method for producing a metal oxide powder according to claim 1, wherein the metal is at least one metal element selected from the group consisting of Sc, Y, Ce, Pr, Nd, Pm, Eu, Gd, Tb, Dy, Ho, Er, Tm, Yb and Lu, elements belonging to group 13 of the Periodic Table, elements belonging to group 4 of the Periodic Table, elements belonging to group 5 of the Periodic Table, elements belonging to group 6 of the Periodic Table, elements belonging to groups 8–10 of the Periodic Table, Cu, Be, Mg, Si, Ge, Sn, Sb and Mn; wherein the halogen gas is chloride gas; and wherein the hydrogen halide gas is hydrogen chloride gas.

3. The method for producing a metal oxide powder according to claim 1, wherein the metal is at least one metal element selected from the group consisting of elements belonging to group 12 of the Periodic Table, elements belonging to group 3 of the Periodic Table, elements belonging to group 13 of the Periodic Table, elements belonging to group 4 of the Periodic Table, elements belonging to group 5 of the Periodic Table, elements belonging to group 6 of the Periodic Table, elements belonging to groups 8–10 of the Periodic Table, Cu, Be, Mg, Ca, Si, Ge, Sn, Sb, Bi and Mn; wherein the halogen gas is bromine gas; and wherein the hydrogen halide gas is hydrogen bromide gas.

4. The method for producing a metal oxide powder according to claim 1, wherein the metal is at least one metal element selected from the group consisting of elements belonging to group 2, of the Periodic Table, elements belonging to group 12 of the Periodic Table, elements belonging to group 3 of the Periodic Table, elements belonging to group 13 of the Periodic Table, elements belonging to group 4 of the Periodic Table, elements belonging to group 5 of the Periodic Table, elements belonging to group 6 of the Periodic Table, elements belonging to groups 8–10 of the Periodic Table, Li, Cu, Si, Ge, Sn, Pb, As, Sb, Bi and Mn; wherein the halogen gas is iodine gas; and wherein the hydrogen halide gas is hydrogen iodide gas.

5. The method for producing a metal oxide powder according to claim 1, wherein the metal is at least one metal element selected from the group consisting of elements belonging to group 3 of the Periodic Table, elements belonging to group 13 of the Periodic Table, elements belonging to group 4 of the Periodic Table, elements belonging to croup 5 of the Periodic Table, elements belonging to group 6 of the Periodic Table, elements belonging to groups 8–10 of the Periodic Table, Cu, Si and Ge; wherein the halogen gas is fluorine gas; and wherein the hydrogen halide gas is hydrogen fluoride gas.

6. A method for producing a metal oxide powder which comprises heating a metal or metals in an atmosphere gas comprising (a) a halogen gas, a hydrogen halide gas or a mixture of these gases in a concentration of from 0.5% by volume to 99.5% by volume; and (b) oxygen, water vapor, a mixture of these gases or air in a concentration of from 0.5% by volume to 99.5% by volume.

\* \* \* \* \*